United States Patent
Nishimoto et al.

(10) Patent No.: US 11,991,481 B2
(45) Date of Patent: May 21, 2024

(54) DISPLAY METHOD, INFORMATION PROCESSING DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventors: Tetsuta Nishimoto, Ueda (JP); Akiko Furuta, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 147 days.

(21) Appl. No.: 17/674,307

(22) Filed: Feb. 17, 2022

(65) Prior Publication Data
US 2022/0264062 A1     Aug. 18, 2022

(30) Foreign Application Priority Data
Feb. 18, 2021  (JP) ................................. 2021-024018

(51) Int. Cl.
*G09G 5/38* (2006.01)
*G06T 5/50* (2006.01)
(Continued)

(52) U.S. Cl.
CPC ............. *H04N 9/3147* (2013.01); *G06T 5/50* (2013.01); *G06T 7/50* (2017.01); *H04N 9/3185* (2013.01); *G06T 2207/20221* (2013.01)

(58) Field of Classification Search
CPC ........ G06F 3/1446; G06F 3/0425; G06F 3/01; G06T 5/006; G06T 3/005;
(Continued)

(56) References Cited

U.S. PATENT DOCUMENTS

| | | |
|---|---|---|
| 2012/0120372 A1 | 5/2012 | Timoner et al. |
| 2019/0116356 A1 | 4/2019 | Matoba et al. |
| 2021/0067752 A1* | 3/2021 | Sandow ................... G06F 3/00 |

FOREIGN PATENT DOCUMENTS

| | | |
|---|---|---|
| JP | 2005-313291 A | 11/2005 |
| JP | 2014-052393 A | 3/2014 |

(Continued)

OTHER PUBLICATIONS

Epson, "PowerLite L610U," Projector Throw Distance Simulator, v2.2.3.20210908, Sep. 8, 2021.
(Continued)

*Primary Examiner* — Hau H Nguyen
(74) *Attorney, Agent, or Firm* — Oliff PLC

(57) ABSTRACT

There is provided a display method including acquiring first information representing a three-dimensional shape of a room including a projection surface onto which a first image is projected, displaying, based on the first information, a second image showing the three-dimensional shape of the room by a display device, acquiring second information which defines a projection range of the first image in the projection surface by receiving operation for designating the projection range, and displaying, by the display device, and based on the first information and the second information, third information superimposed on the second image indicating at least one of a number of one or a plurality of projectors disposed in the room in order to project the first image in the projection range, a model of the one or the plurality of projectors, or a setting position in the room of the one or the plurality of projectors.

13 Claims, 6 Drawing Sheets

(51) Int. Cl.
*G06T 7/50* (2017.01)
*H04N 9/31* (2006.01)

(58) Field of Classification Search
CPC .. G06T 2207/20221; G09G 2340/0464; G09G 5/38; G09G 3/002; G09G 5/377; H04N 9/3147; H04N 5/74; H04N 13/363
See application file for complete search history.

(56) References Cited

FOREIGN PATENT DOCUMENTS

| | | |
|---|---|---|
| JP | 2014-056044 A | 3/2014 |
| JP | 2017-059931 A | 3/2017 |
| JP | 2017-161908 A | 9/2017 |
| WO | 2017/179272 A1 | 10/2017 |
| WO | 2019/017023 A1 | 1/2019 |

OTHER PUBLICATIONS

Sony, "VPL-CWZ10," Optimal Viewing Area Simulation, (Feb. 18, 2021).

* cited by examiner

|  | PROJECTION RANGE | MODEL | NUMBER | SETTING POSITION |
|---|---|---|---|---|
| PATTERN 1 | INPUT | INPUT | INPUT | OUTPUT |
| PATTERN 2 | INPUT | OUTPUT | OUTPUT | INPUT |
| PATTERN 3 | INPUT | OUTPUT | INPUT | INPUT |
| PATTERN 4 | INPUT | INPUT | OUTPUT | INPUT |
| PATTERN 5 | INPUT | OUTPUT | OUTPUT | OUTPUT |
| PATTERN 6 | INPUT | OUTPUT | INPUT | OUTPUT |
| PATTERN 7 | INPUT | INPUT | OUTPUT | OUTPUT | ized.

DISPLAY METHOD, INFORMATION PROCESSING DEVICE, AND NON-TRANSITORY COMPUTER-READABLE STORAGE MEDIUM STORING PROGRAM

The present application is based on, and claims priority from JP Application Serial Number 2021-024018, filed Feb. 18, 2021, the disclosure of which is hereby incorporated by reference herein in its entirety.

BACKGROUND

1. Technical Field

The present disclosure relates to a display method, an information processing device, and a program.

2. Related Art

WO 2017/179272 (Patent Literature 1) discloses a technique for generating, based on user set parameters and projector parameters, a simulation image including a projector and a display region of an image projected by the projector to thereby support setting of the projector. The user set parameters represent at least one of a position, a posture, and a lens shift amount of the projector and an aspect ratio of the image. Examples of the projector parameters include correcting function information concerning a distortion correcting function of the projector.

To perform a simulation according to the technique disclosed in Patent Literature 1, a user needs to input the user set parameters and the projector parameters. The user is requested to have expert knowledge equal to or higher than a certain level concerning the projector. Therefore, it is difficult for a user not having the expert knowledge concerning the projector to appropriately set the projector according to the technique disclosed in Patent Literature 1.

SUMMARY

A display method according to an aspect of the present disclosure includes: acquiring first information representing a three-dimensional shape of a room including a projection surface onto which a first image is projected; causing, based on the first information, a display device to display a second image showing the three-dimensional shape of the room; receiving operation for designating a projection range of the first image in the projection surface to thereby acquire second information for defining the projection range; and causing, based on the first information and the second information, the display device to display, to be superimposed on the second image, third information indicating at least one of a number of one or a plurality of projectors to be set in the room in order to project the first image in the projection range, a model of the one or the plurality of projectors, and a setting position in the room of the one or the plurality of projectors.

An information processing device according to an aspect of the present disclosure includes: a display device; and at least one processing device. The at least one processing device executes: acquiring first information representing a three-dimensional shape of a room including a projection surface onto which a first image is projected; causing, based on the first information, a display device to display a second image showing the three-dimensional shape of the room; receiving operation for determining a projection range of the first image in the projection surface to thereby acquire second information for defining the projection range; and causing, based on the first information and the second information, the display device to display, to be superimposed on the second image, third information indicating at least one of a number of one or a plurality of projectors to be set in the room in order to project the first image in the projection range, a model of the one or the plurality of projectors, and a setting position in the room of the one or the plurality of projectors.

A non-transitory computer-readable storage medium according to an aspect of the present disclosure stores a program for causing a computer to execute: acquiring first information representing a three-dimensional shape of a room including a projection surface onto which a first image is projected; causing, based on the first information, a display device to display a second image showing the three-dimensional shape of the room; receiving operation for designating a projection range of the first image in the projection surface to thereby acquire second information for defining the projection range; and causing, based on the first information and the second information, the display device to display, to be superimposed on the second image, third information indicating at least one of a number of one or a plurality of projectors to be set in the room in order to project the first image in the projection range, a model of the one or the plurality of projectors, and a setting position in the room of the one or the plurality of projectors.

DESCRIPTION OF EXEMPLARY EMBODIMENTS

An embodiment of the present disclosure is explained below with reference to the drawings. Technically preferred various limitations are added to the embodiment explained below. However, the embodiment of the present disclosure is not limited to forms explained below.

1. Embodiment

Figure 1:
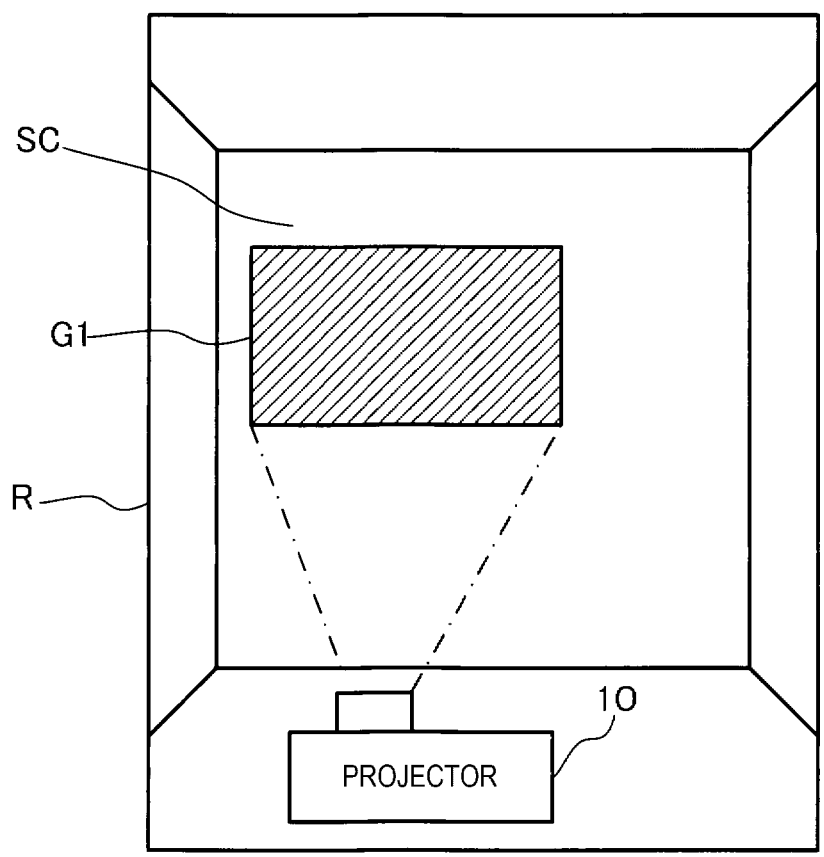
FIG. 1 is a diagram showing a configuration example of an information processing device according to an embodiment of the present disclosure.
Figure 1:
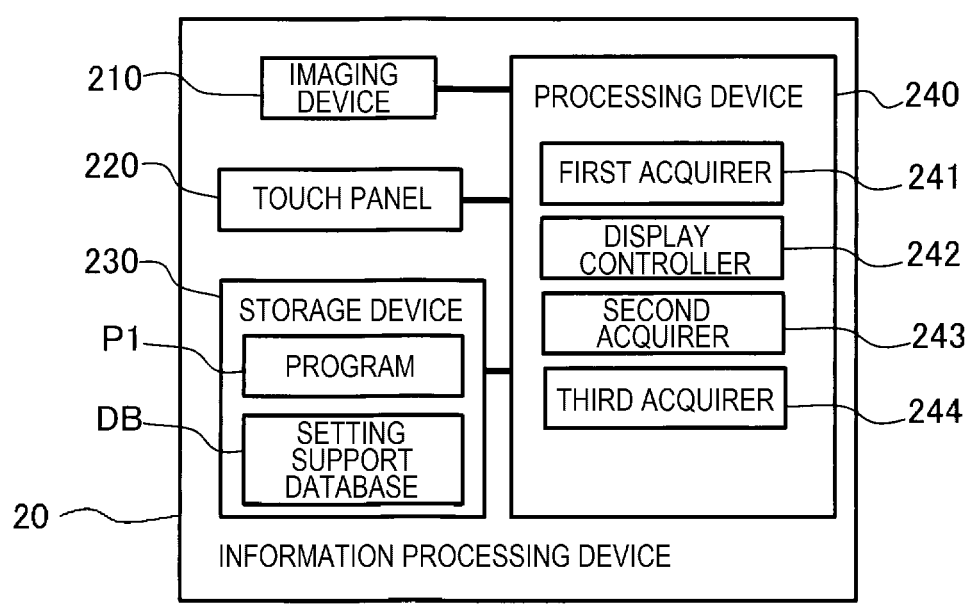

FIG. 1 is a diagram showing a configuration example of an information processing device 20 according to an embodiment of the present disclosure. In FIG. 1, besides the information processing device 20, a room R including a projection surface SC onto which a projection image G1 is projected and a projector 10 set in the room R in order to project the projection image G1 are shown. The projection image G1 is an example of the first image in the present disclosure. The room R is a closed space marked off by a ceiling, a floor surface, and four walls. In FIG. 1, illustration of the wall on the near side among the four walls of the room R is omitted. The wall on the depth side is the projection surface SC. The room R only has to include two or more continuous surfaces equivalent to the walls. For example, the room R may be an environment without a ceiling and a wall opposed to the projection surface SC.

The information processing device 20 displays information for setting the projector 10 in the room R such that even a user not having expert knowledge concerning a projector sets, in a desired position of the projection surface SC, a projection range having a desired shape and the projection image G1 is projected in the projection range. The user of the information processing device 20 can appropriately set the projector 10 in the room R by setting the projector 10 according to the information displayed by the information processing device 20.

The information processing device 20 is, for example, a smartphone. As shown in FIG. 1, the information processing device 20 includes an imaging device 210, a touch panel 220, a storage device 230, and a processing device 240. The information processing device 20 includes an inertial sensor as well like a general smartphone besides the imaging device 210, the touch panel 220, the storage device 230, and the processing device 240 shown in FIG. 1. However, illustration of the inertial sensor is omitted in FIG. 1.

The imaging device 210 is a camera including, for example, a CCD (Charge Coupled Device) or a CMOS (Complementary Metal Oxide Semiconductor), which is an imaging element that converts condensed light into an electric signal. The imaging device 210 captures a moving image or a still image under control by the processing device 240. The imaging device 210 outputs image data representing the captured moving image or still image to the processing device 240.

The touch panel 220 is a device obtained by integrating a display device and an input device to which information is input by the user. The display device is, for example, a liquid crystal display. The input device is, for example, a transparent sheet-like contact sensor. The input device is provided to cover a display surface of the display device. The input device detects a touch position using capacitance specified by an object, which is in contact with the input device, and the input device and outputs data indicating the detected touch position to the processing device 240. Consequently, content of operation of the touch panel 220 by the user is transmitted to the processing device 240.

The storage device 230 is a recording medium readable by the processing device 240. The storage device 230 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

Figure 2:
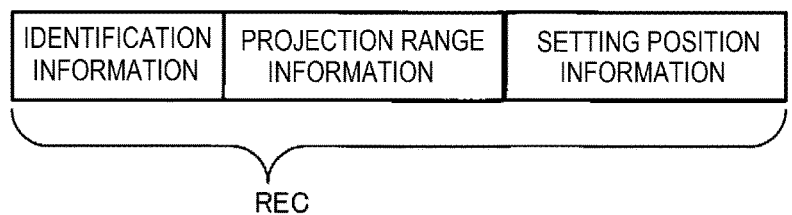
FIG. 2 is a diagram showing an example of a record forming a setting support database stored in a storage device of the information processing device.

A setting support database DB is stored in the storage device 230. The setting support database DB is an aggregate of a record REC shown in FIG. 2. That is, the setting support database DB is configured by a plurality of records REC. As shown in FIG. 2, in the record REC, projection range information and setting position information are stored in association with identification information uniquely indicating a model of a projector. Specific examples of the identification information include a character string indicating a model number of the projector and a character string indicating a model name of the projector.

The projection range information indicates a shape and a position of a projection image displayed on the projection surface, that is, a shape and a position of a projection range. In this embodiment, the position of the projection range means the position of the center of the projection range. Specific examples of the projection range information include information indicating an aspect ratio of a projection image projected in the projection range, the length of a diagonal line of the projection image, and the position of the center of the projection image.

The setting position information indicates a setting position of the projector of the model indicated by the identification information associated with the setting position information. More specifically, the setting position information indicates a setting position of the projector at the time when the projection image is appropriately projected by the projector, the model of which is indicated by the identification information belonging to the record REC, with respect to the projection range, the shape and the position of which are indicated by the projection range information belonging to the record REC to which the setting position information belongs. Specific examples of the setting potion information include information indicating a position in a three-dimensional coordinate system having the origin in the center of the projection range indicated by the projection range information belonging to the same record REC. The setting position information may include information indicating a setting place of the projector and information indicating a posture of the projector. Examples of the information indicating the setting place of the projector include information indicating whether the projector is suspended from a ceiling or is placed on an object such as a desk in a room. Specific examples of the information indicating the posture of the projector include a rotation amount of the projector around the vertical axis passing the center of gravity of the projector, a rotation amount of the projector around the optical axis of projected light projected from the projector, and a rotation amount of the projector around an axis orthogonal to the vertical axis and orthogonal to the optical axis.

In the setting support database DB in this embodiment, a plurality of records REC including the same identification information and including the projection range information and the setting position information different from one another are sometimes recorded. This is because, if the shape or the position of the projection range is different, a setting position of the projector could be different. In the setting support database DB in this embodiment, the record REC concerning the projector 10 is stored in advance.

In the nonvolatile memory of the storage device 230, a program P1 to be executed by the processing device 240 is stored in advance. The volatile memory of the storage device 230 is used by the processing device 240 as a work area in executing the program P1. The program P1 can be called "application program", "application software", or "application" as well.

The processing device 240 includes a processor such as a CPU (Central Processing Unit), that is, a computer. The processing device 240 reads out the program P1 from the nonvolatile memory to the volatile memory and starts execution of the program P1 when operation for instructing an execution start of the program P1 is performed on the input device of the touch panel 220. The processing device 240 operating according to the program P1 functions as a first acquirer 241, a display controller 242, a second acquirer 243, and a third acquirer 244 shown in FIG. 1. The first acquirer 241, the display controller 242, the second acquirer 243, and the third acquirer 244 shown in FIG. 1 are software modules realized by causing the processing device 240 to operate according to the program P1. Functions of the first acquirer 241, the display controller 242, the second acquirer 243, and the third acquirer 244 are as explained below.

The first acquirer 241 images the room R using the imaging device 210 located in the room R to thereby acquire room information indicating a three-dimensional shape of the room R using the existing AR (Augmented Reality) technology. The room information indicates the width, the depth, and the height of the room R. The room information indicates a relative positional relation among a plurality of walls of the room R. The room information acquired by the first acquirer 241 is an example of the first information in the present disclosure. The room information includes conversion information for mutually converting a position on an image obtained by imaging the room R with the imaging device 210 located in the room R and a position in the room R. The first acquirer 241 causes the display device of the touch panel 220 to display a message for instructing the user to stand in the position in the center of the room R and grip the information processing device 20 in a state in which the imaging device 210 is directed to any one of the walls of the room R and, at the same time, capture a moving image while turning 360° in the position. Specific examples of the message include a message such as "Please stand in the center of the room and perform scanning 360° with the camera". The range for capturing the moving image is an example and may be smaller than 360° if three-dimensional shapes of the projection surface SC and the room R in a range necessary for setting the projector can be acquired.

While the user is imaging the room R with the imaging device 210, the first acquirer 241 additionally writes an output value from a not-shown inertial sensor in the volatile memory of the storage device 230 in every predetermined time. Subsequently, the first acquirer 241 extracts a natural feature point based on a color or the like about each of a plurality of frames forming a moving image captured by the imaging device 210 and specifies a change in the position of the natural feature point, that is, a movement of the natural feature point over the plurality of frames. The first acquirer 241 acquires, from the movement of the natural feature point over the plurality of frames forming the moving image and changes in the position and the direction of the imaging device 210 indicated by a series of output values stored in the volatile memory, the room information according to, for example, the same method as three-dimensional measurement performed using a stereo camera. The first acquirer 241 may change a display color about a portion where the three-dimensional measurement is completed or give a pattern to the portion and, at the same time, cause the display device to display images of the frames. The first acquirer 241 may cause the display device to display a message such as "completed" at a point in time when the rotation of 360° ends.

Figure 3:
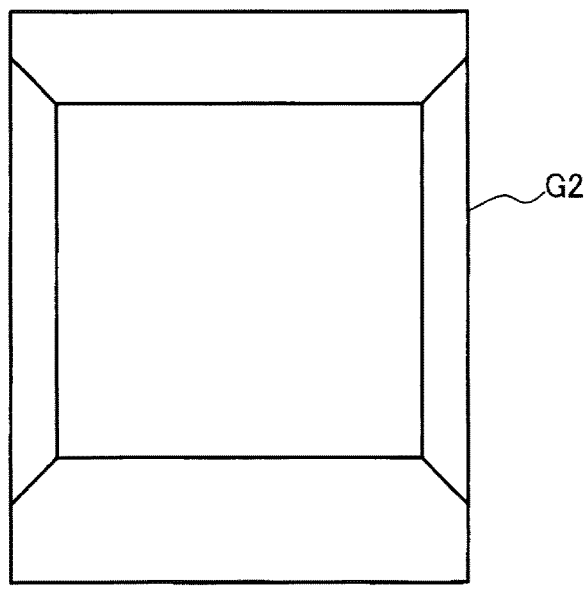
FIG. 3 is a diagram showing an example of a room image displayed on a display device of the information processing device.

The display controller 242 causes the display device of the touch panel 220 to display an image obtained by superimposing a projection range image showing a projection range on a room image showing a three-dimensional shape of the room R. More specifically, in order to cause the user to designate a projection range, first, the display controller 242 causes the display device of the touch panel 220 to display a room image G2 shown in FIG. 3 based on the room information. The room image G2 is an example of the second image in the present disclosure. As explained above, the room R includes the plurality of walls. A relative positional relation among the plurality of walls of the room R is represented by the room information. The room image G2 displayed based on the room information shows the plurality of walls of the room R. Subsequently, the display controller 242 causes the display device to display a notification for urging designation of a projection surface. Specific examples of the notification include a message such as "Please determine the position of the projection surface". The user can designate a wall at a projection destination of the projection image G1, that is, the projection surface SC by performing, on the touch panel 220, operation such as tapping of any one of the plurality of walls shown by the room image G2. The display controller 242 receives, via the touch panel 220, operation of the user for designating the wall at the projection destination of the projection image G1 to thereby specify, as the projection surface SC, the wall designated by the user. In the following explanation, the operation for designating the wall at the projection destination of the projection image G1 is sometimes referred to as "projection surface designating operation".

Figure 4:
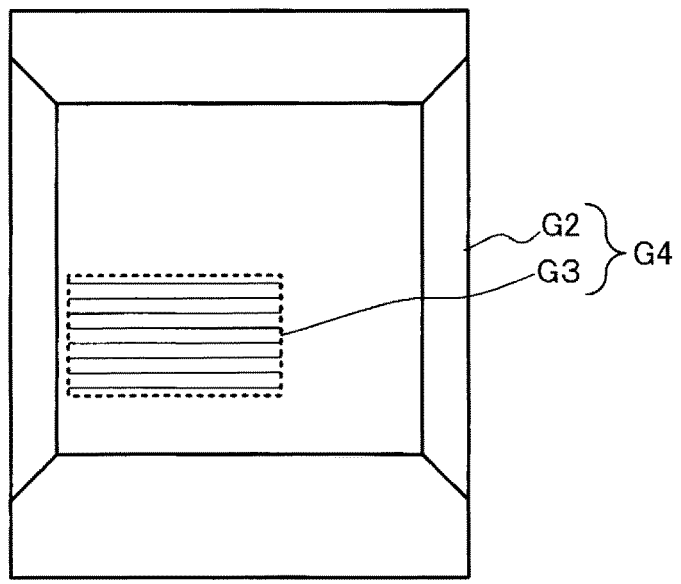
FIG. 4 is a diagram showing an example of an image displayed on the display device of the information processing device.

When the projection surface designating operation is performed, the display controller 242 causes the display device of the touch panel 220 to display an image G4 shown in FIG. 4. The image G4 is an image obtained by superimposing a provisional image G3 showing a provisional projection range on the wall designated by the projection surface designating operation in the room image G2. In addition, the display controller 242 causes the display device of the touch panel 220 to display a notification for urging operation for changing the shape and the position of the provisional image G3. Specific examples of the notification include a message such as "Please change the position and the shape of the projection range to a desired position and a desired shape". As shown in FIG. 4, the provisional image G3 in this embodiment is an image representing a rectangle. Examples of operation for changing the shape of the provisional image G3 include operation for dragging any one of four corners of the provisional image G3 to thereby enlarge or reduce the provisional image G3. Specific examples of operation for changing the position of the provisional image G3 include operation for selecting the provisional image G3 and dragging the provisional image G3 to a desired position and, thereafter, dropping the provisional image G3. In the following explanation, the operation for changing the shape and the position of the provisional image G3 is sometimes referred to as "projection range changing operation".

Figure 5:
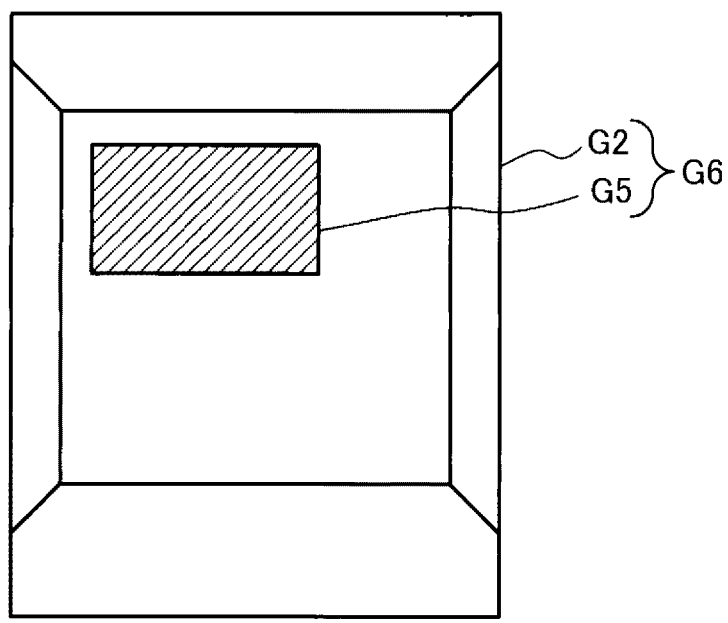
FIG. 5 is a diagram showing an example of an image displayed on the display device of the information processing device.

When the shape and the position of the provisional image G3 are changed to the desired shape and the desired position by the projection range changing operation, the user performs projection range determining operation on the touch panel 220. The projection range changing operation and the projection range determining operation can also be called operation for designating the projection range. Specific examples of the projection range determining operation include operation for tapping the provisional image G3 twice. When the projection range determining operation is performed on the touch panel 220, the shape and the position of the provisional image G3 at a point in time when the operation is performed is set as the shape and the position of the projection range. When the projection range determining operation is performed, the display controller 242 causes the display device of the touch panel 220 to display an image G6 shown in FIG. 5. The image G6 is an image obtained by superimposing projection range information G5 indicating the projection range on the room image G2. The projection range image G5 shows a projection range, which is a result of changing a provisional projection range by receiving operation for changing the shape and the position of the provisional image G3. The projection range image G5 is an example of the third image in the present disclosure.

When the projection range is determined, the display controller 242 causes the display device of the touch panel 220 to display a notification for urging designation of the number of projectors to be set in the room R and a model of the projectors. Specific examples of the notification include a message such as "Please designate the number and a model of projectors set in the room". When acquiring projector information indicating the number of projectors to be set in the room R and the model of the projectors, the display controller 242 specifies setting positions of the projectors in the room R referring to the setting support database DB. More specifically, the display controller 242 searches through the setting support database DB using designated range information indicating the projection range determined by the user and the projector information as search keys to thereby acquire the setting position information. The designated range information is information indicating the shape and the position of the provisional image G3, that is, the shape and the position of the projection range at a point in time when the projection range determining operation is performed. The projector information is an array of identification information of one or a plurality of projectors to be set in the room R. As explained in detail below, in this embodiment, one kind of identification information of the projector 10 is acquired as the projector information.

Figure 6:
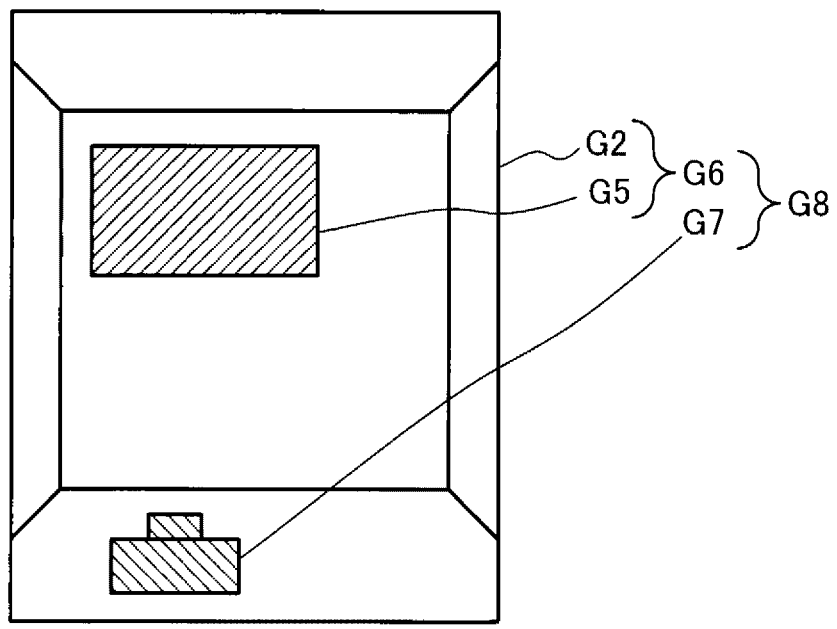
FIG. 6 is a diagram showing an example of an image displayed on the display device of the information processing device.

If the setting position indicated by the acquired setting position information is not a position within a range indicated by the room information, the display controller 242 outputs a notification for urging the user to designate any one of a projection range, a model, and the number of projectors again. On the other hand, if the setting position indicated by the acquired setting position information is a position within the range indicated by the room information, the display controller 242 specifies the setting position indicated by the setting position information as a setting position of the projector in the room R. The display controller 242 causes, based on the specified setting position, the display device of the touch panel 220 to display an image G8 shown in FIG. 6. The image G8 shown in FIG. 6 is an image obtained by superimposing an icon G7 indicating the projector 10 on the specified setting position of the image G6. The icon G7 is an example of the third information in the present disclosure.

The second acquirer 243 acquires, in response to the projection range determining operation, as the designated range information, the shape and the position of the provisional image G3 at a point in time when the projection range determining operation is performed.

The third acquirer 244 acquires, as the projector information, one or a plurality of kinds of identification information input according to a notification for urging the user to input, as the projector information, identification information of one or a plurality of projectors to be set in the room R. As explained above, in this embodiment, the user inputs one kind of identification information of the projector 10 with operation on the touch panel 220. Accordingly, in this embodiment, the third acquirer 244 acquires the identification information of the projector 10 as the projector information.

Figure 7:
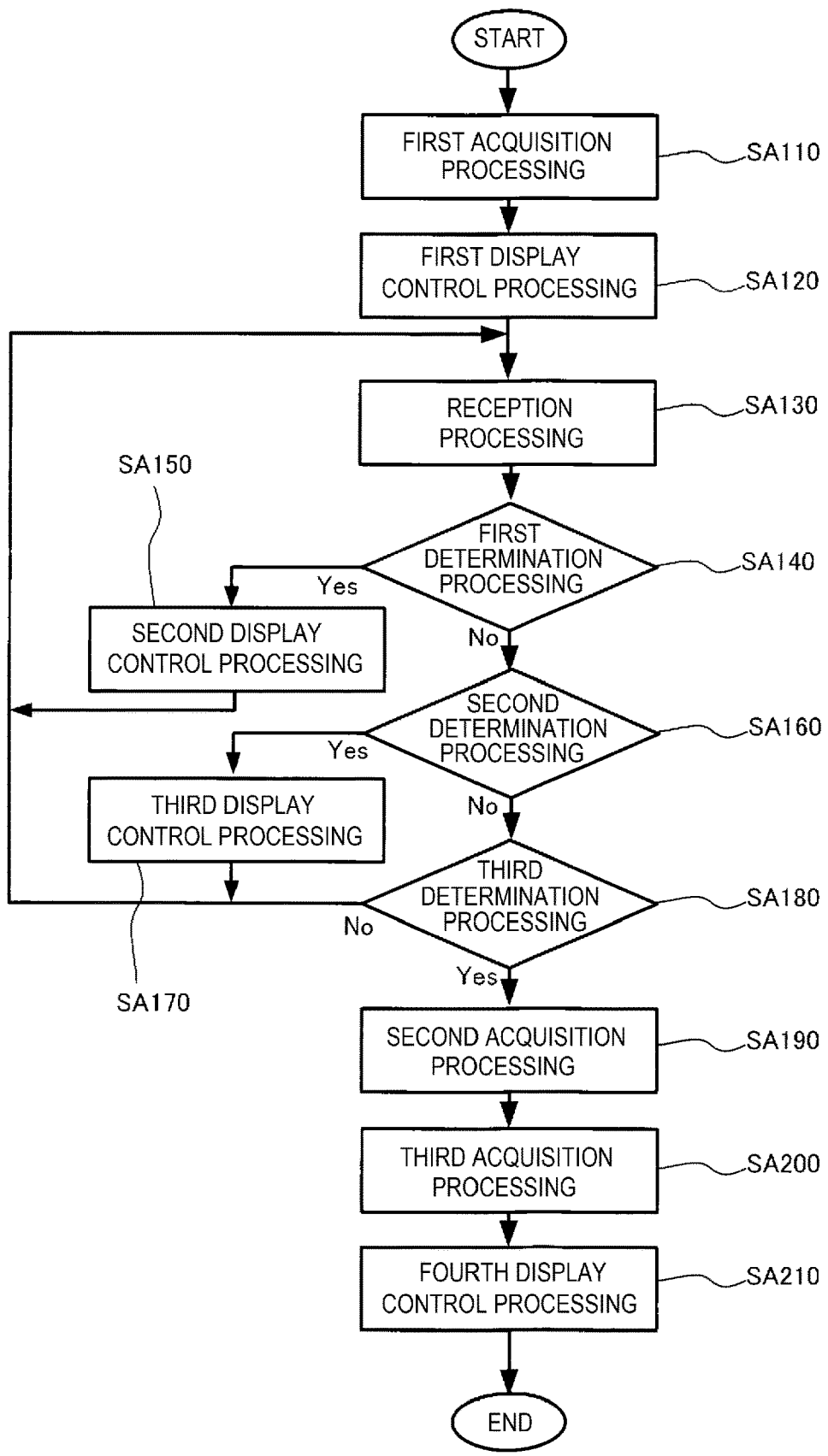
FIG. 7 is a flowchart showing a flow of a display method executed by a processing device of the information processing device according to a program.

The processing device 240 operating according to the program P1 executes a display method markedly showing characteristics of this embodiment. FIG. 7 is a flowchart showing a flow of the display method. As shown in FIG. 7, this display method includes first acquisition processing SA110, first display control processing SA120, reception processing SA130, first determination processing SA140, second display control processing SA150, second determination processing SA160, third display control processing SA170, third determination processing SA180, second acquisition processing SA190, third acquisition processing SA200, and fourth display control processing SA210.

In the first acquisition processing SA110, the processing device 240 functions as the first acquirer 241. In the first acquisition processing SA110, the processing device 240 images the room R using the imaging device 210 located in the room R to thereby acquire the room information.

In the first display control processing SA120, the processing device 240 functions as the display controller 242. In the first display control processing SA120, the processing device 240 causes, based on the room information acquired in the first acquisition processing SA110, the display device of the touch panel 220 to display the room image G2. In the first display control processing SA120, the processing device 240 causes the display device of the touch panel 220 to display a notification for using designation of a projection surface.

In the reception processing SA130, the processing device 240 receives operation of the user via the touch panel 220. In the first determination processing SA140, the processing device 240 determines whether the operation received in the reception processing SA130 is projection surface designating operation. When the operation received in the reception processing SA130 is the projection surface designating operation, a determination result of the first determination processing SA140 is "Yes". When the determination result of the first determination processing SA140 is "Yes", the processing device 240 executes the second display control processing SA150. When the operation received in the reception processing SA130 is not the projection surface designating operation, the determination result of the first determination processing SA140 is "No". When the determination result of the first determination processing SA140 is "No", the processing device 240 executes the second determination processing SA160.

In the second display control processing SA150, the processing device 240 functions as the display controller 242. In the second display control processing SA150, the processing device 240 causes the display device of the touch panel 220 to display the image G4 obtained by superimposing the provisional image G3 on the room image G2. In the second display control processing SA150, the processing device 240 causes the display device of the touch panel 220 to display a notification for urging a change of the shape and the position of the provisional image G3. When completing the execution of the second display control processing SA150, the processing device 240 executes the reception processing SA130 again and receives operation of the user via the touch panel 220.

In the second determination processing SA160, the processing device 240 determines whether the operation received in the reception processing SA130 is projection range changing operation. When the operation received in the reception processing SA130 is the projection range changing operation, a determination result of the second determination processing SA160 is "Yes". When the determination result of the second determination processing SA160 is "Yes", the processing device 240 executes the third display control processing SA170. When the operation received in the reception processing SA130 is not the projection range changing operation, the determination result of the second determination processing SA160 is "No". When the determination result of the second determination processing SA160 is "No", the processing device 240 executes the third determination processing SA180.

In the third display control processing SA170, the processing device 240 functions as the display controller 242. In the third display control processing SA170, the processing device 240 changes the shape and the position of the provisional image G3 according to projection range changing operation. When completing the execution of the third display control processing SA170, the processing device 240 executes the reception processing SA130 again and receives operation of the user via the touch panel 220.

In the third determination processing SA180, the processing device 240 determines whether the operation received in the reception processing SA130 is projection range determining operation. When the operation received in the reception processing SA130 is the projection range determining operation, a determination result of the third determination processing SA180 is "Yes". When the determination result of the third determination processing SA180 is "Yes", the processing device 240 executes the second acquisition processing SA190. When the operation received in the reception processing SA130 is not the projection range determining operation, the determination result of the third determination processing SA180 is "No". When the determination result of the third determination processing SA180 is "No", the processing device 240 regards the operation received in the reception processing SA130 as invalid operation and executes the reception processing SA130 and the subsequent processing again.

In the second acquisition processing SA190, the processing device 240 functions as the display controller 242 and the second acquirer 243. In the second acquisition processing SA190, first, the processing device 240 functions as the second acquirer 243 and acquires the designated range information based on a position occupied by the provisional image G3 and the shape of the provisional image G3 at a point in time when projection surface determining operation is performed. Subsequently, the processing device 240 functions as the display controller 242 and causes the display device of the touch panel 220 to display the image G6 obtained by superimposing the projection range image G5 having a shape indicated by the designated range information on the room image G2.

In the third acquisition processing SA200 following the second acquisition processing SA190, the processing device 240 functions as the display controller 242 and the third acquirer 244. In the third acquisition processing SA200, first, the processing device 240 functions as the display controller 242 and causes the display device of the touch panel 220 to display a notification for urging an input of the projector information. Subsequently, the processing device 240 functions as the third acquirer 244 and acquires the projector information input by operation on the touch panel 220.

In the fourth display control processing SA210 following the third acquisition processing SA200, the processing device 240 functions as the display controller 242. In the fourth display control processing SA210, the processing device 240 acquires setting information based on the room information acquired in the first acquisition processing SA110, the designated range information acquired in the second acquisition processing SA190, and the projector information acquired in the third acquisition processing SA200. The processing device 240 causes the display device of the touch panel 220 to display the image G8 obtained by further superimposing the icon G7 indicating the projector 10 on the image G6.

As explained above, the information processing device 20 in this embodiment causes, based on the room information acquired using the AR technology, the display device to display the room image G2 for designating the shape and the position of the projection range of the projection image G1 to the user. The user visually recognizing the room image G2 can set, in a desired position, a projection range having a desired shape by performing the projection surface designating operation, the projection range changing operation, and the projection range determining operation. By further designating the number and a model of projectors to be set in the room R, the user can visually grasp, through the image G8, a setting position of a projector that should be set in the room R in order to project the projection image G1 in the projection range. What should be noted is that no particular expert knowledge is necessary for acquisition of the room information, designation of the shape of the projection range, designation of the position of the projection range, designation of the number of projectors to be set in the room R, and designation of the model of the projectors to be set in the room R. According to this embodiment, even a user not having expert knowledge concerning a projector can set the projector 10 in a position where the projection image G1 can be projected in a projection range having a desired shape in a desired position in the room R.

2. Modifications

The embodiment explained above can be modified as follows.

(1) The first acquirer 241 in the embodiment generates the room information using the AR technology based on the image captured by the imaging device 210. However, the first acquirer 241 may cause the user to input numerical values indicating the width, the depth, and the height of the room R and may generate the room information based on the numerical values input by the user. No particular expert knowledge is necessary about the input of the numerical values indicating the width, the depth, and the height of the room R. In the case of an aspect in which the room information is generated based on the numerical values input by the user, the imaging device 210 can be omitted.

(2) Prior to the execution of the fourth display control processing SA210, processing for receiving an input of information for limiting a range in which the projector 10 is set in the room R may be executed. The information for limiting the range in which the projector 10 is set in the room R can be considered information indicating the range in which the projector 10 is set in the room R. The information indicating the range in which the projector 10 is set in the room R is an example of the fourth information in the present disclosure. Examples of the information for limiting the range in which the projector 10 is set in the room R include information indicating an upper limit value of the distance from the center of the projection range to a setting position of the projector 10. In an aspect in which the information indicating the upper limit value of the distance from the center of the projection range to the setting position of the projector 10 is used as the information for limiting the range in which the projector 10 is set in the room R, in the fourth display control processing SA210, the processing device 240 acquires the setting position information in which the distance from the center of the projection range is equal to or smaller than the upper limit value among the setting position information read out from the setting support database DB based on the projector information and the designated range information.

An aspect in which an input of the information indicating the range in which the projector 10 is set in the room R is received may include urging the input of the information by causing the display device to display, to be superimposed on the room image G2, a candidate image showing a candidate of the range in which the projector 10 is set in the room R. The candidate image is an example of the fourth image in the present disclosure. Examples of the candidate image include an image of an object to be a candidate of a setting destination of the projector 10 such as a desk and an image showing a plurality of spherical surfaces having concentric circular shapes centering on the center position of the projection range.

(3) The display method in the embodiment may further include causing the display device to display a notification for urging the user having the information processing device 20 to move to a position in the room R corresponding to the position of the icon G7. The processing device 240 calculates a position of the information processing device 20 from the room information and the information of the inertial sensor, compares the position with a setting position to determine a moving direction and a distance to be notified, and notifies the moving direction and the distance to the user. Specific examples of the notification include a message such as "Please move forward XX meters". For example, when actually setting the projector 10 in the room R, the user can easily dispose the projector 10 in an appropriate setting position by holding the projector 10 and moving according to the notification.

Figures 8, 9:
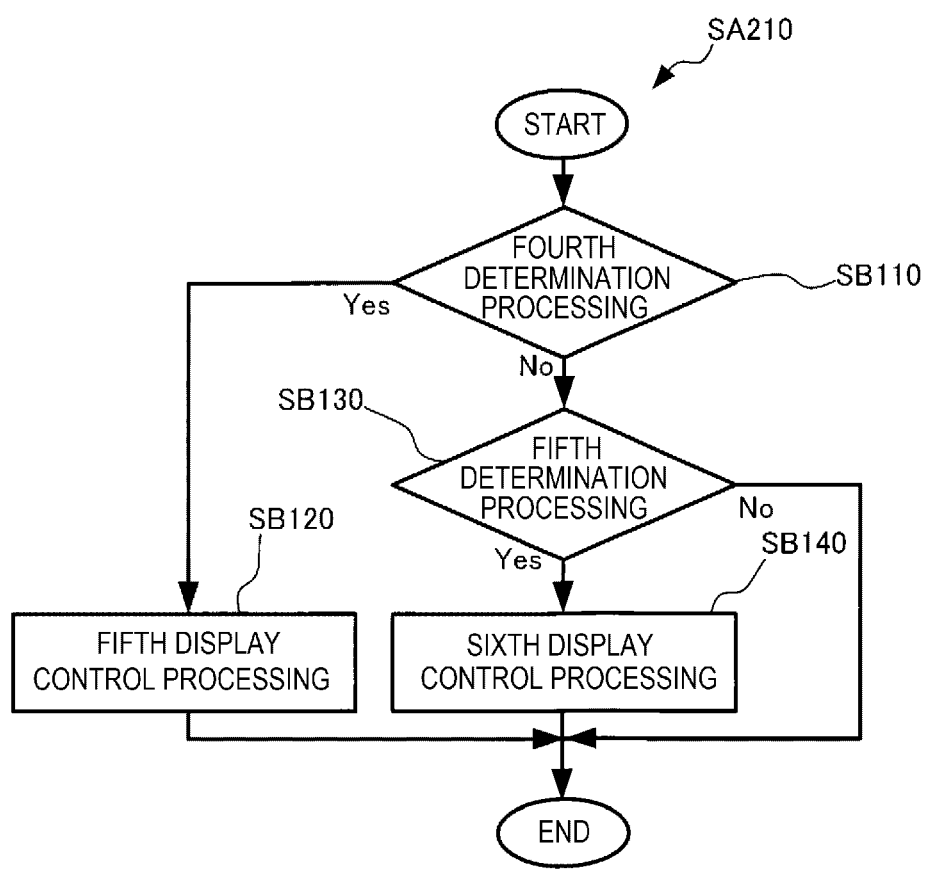
FIG. 8 is a diagram showing combination patterns of inputs and outputs in a display method according to the present disclosure.
FIG. 9 is a flowchart showing a flow of fourth display control processing in a modification.

(4) The designation of the shape and the position of the projection range may be performed by operation for drawing a contour line of the projection range on the room image G2. The designation of the shape and the position of the projection range may be executed according to a numerical value input by the user. In the case of an aspect in which the projection range is designated by the drawing of the contour line or the numerical value input, since the display of the provisional image G3 is unnecessary, the first determination processing SA140, the second display control processing SA150, the second determination processing SA160, and the third display control processing SA170 can be omitted. In the embodiment, inputs and outputs of a pattern 1 in FIG. 8 are realized by causing the user to designate the number and a model of projectors to be set in the room R in addition to the designation of the shape and the position of the projection range. In FIG. 8, "input" means that information concerning a corresponding item of a table is input to the information processing device 20 by operation of the user and "output" means that the information processing device 20 outputs the information concerning the corresponding item. Designation of one or both of the number and the model of projectors set in the room R may be omitted. When the designation of both of the number and the model of projectors set in the room R is omitted, the third acquirer 244 and the third acquisition processing SA200 can be omitted.

In the case of an aspect in which a model of projectors to be set in the room R is designated but the number of projectors to be set in the room R is not designated, in the fourth display control processing SA210, as in a pattern 7 shown in FIG. 8, the processing device 240 causes the display device to display the number of projectors to be set in the room R and setting positions of the projectors. FIG. 9 is a flowchart showing a flow of the fourth display control processing SA210 executed by the processing device 240 in the aspect in which a model of projectors to be set in the room R is designated but the number of projectors to be set in the room R is not designated. As shown in FIG. 9, the fourth display control processing SA210 in this aspect includes fourth determination processing SB110, fifth display control processing SB120, fifth determination processing SB130, and sixth display control processing SB140. In the fourth determination processing SB110, the processing device 240 determines whether it is possible to project the projection image G1 in the projection range indicated by the designated range information using the first projector of the model indicated by the projector information. Specifically, when the setting position information corresponding to the identification information indicating the same model as the model of the projector information and the projection range information indicating the same shape as the shape indicated by the designated range information and indicating the same position as the position indicated by the designated range information is stored in the setting support database DB, the processing device 240 determines that the projection image G1 can be projected using the first projector. When the projection image G1 can be projected using the first projector, a determination result of the fourth determination processing SB110 is "Yes". When the projection image G1 cannot be projected using the first projector, the determination result of the fourth determination processing SB110 is "No".

When the determination result of the fourth determination processing SB110 is "Yes", that is, when it is determined in the fourth determination processing SB110 that the projection image G1 can be projected using the first projector, the processing device 240 executes the fifth display control processing SB120. In the fifth display control processing SB120, the processing device 240 causes the display device to display the image G8 obtained by superimposing the fifth image showing the first projector on the image G6. When the determination result of the fourth determination processing SB110 is "No", that is, when it is determined in the fourth determination processing SB110 that the projection image G1 cannot be projected using the first projector, the processing device 240 executes the fifth determination processing SB130. In the fifth determination processing SB130, the processing device 240 determines whether the projection image G1 can be projected in the projection range indicated by the designated range information using the first projector and the second projector of the model indicated by the projector information. For example, the processing device 240 determines whether the projection image G1 can be divided and projected by dividing the projection range indicated by the designated range information into two sub-projection ranges and causing the first projector to cover one sub-projection range and causing the second projector to cover the other sub-projection range. When the projection image G1 can be projected using the first projector and the second projector, a determination result of the fifth determination processing SB130 is "Yes". When the projection image G1 cannot be projected using the first projector and the second projector, the determination result of the fifth determination processing SB130 is "No".

Figure 10:
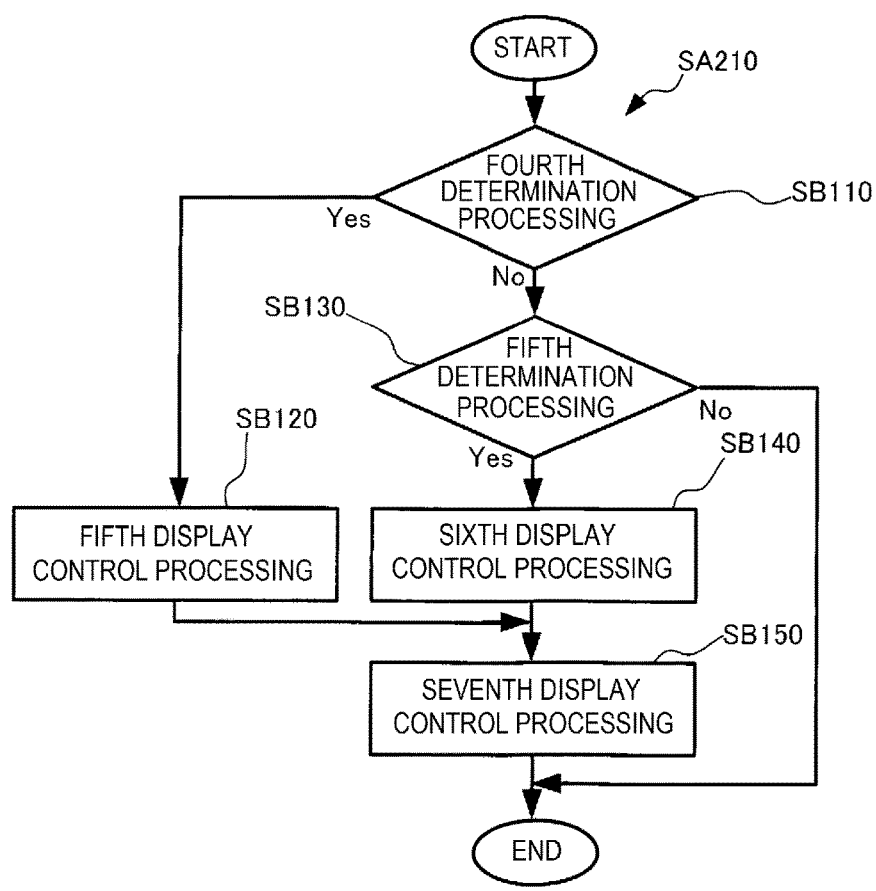
FIG. 10 is a flowchart showing a flow of the fourth display control processing in a modification.

When the determination result of the fifth determination processing SB130 is "Yes", that is, when it is determined in the fifth determination processing SB130 that the projection image G1 can be projected using the first projector and the second projector, the processing device 240 executes the sixth display control processing SB140. In the sixth display control processing SB140, the processing device 240 causes the display device to display the image G8 obtained by superimposing the fifth image showing the first projector and the sixth image showing the second projector on the image G6. In the fourth display control processing SA210 shown in FIG. 9, when the determination result of the fifth determination processing SB130 is "No", that is, it is determined in the fifth determination processing SB130 that the projection image G1 cannot be projected using the first projector and the second projector, the processing device 240 ends the fourth display control processing SA210 without executing the sixth display control processing SB140. However, when the determination result of the fifth determination processing SB130 is "No", the processing device 240 may perform the determination and the display in the same manner with the addition of a third projector. The fifth image and the sixth image are examples of the third information indicating the number and the setting positions of projectors. In the fifth display control processing SB120 and the sixth display control processing SB140, the processing device 240 may cause the display device to display a number representing the number of projectors in use. The fourth display control processing SA210 may include, as shown in FIG. 10, seventh display control processing SB150 for displaying, on the display device, an image obtained by further superimposing a seventh image indicating a projection range by the first projector and an eighth image indicating a projection range by the second projector on the image G8. In the seventh display control processing SB150 executed following the fifth display control processing SB120, the processing device 240 causes the display device to display an image obtained by superimposing the seventh image indicating the projection range by the first projector on the image G8. In the seventh display control processing SB150 executed following the sixth display control processing SB140, the processing device 240 causes the display device to display an image obtained by superimposing the seventh image and the eighth image indicating the projection range by the second projector on the image G8.

In the case of an aspect in which the number of projectors to be set in the room R is designated but a model of the projectors to be set in the room R is not designated, in the fourth display control processing SA210, as in a pattern 6 in FIG. 8, the processing device 240 causes the display device to display a model of the projectors to be set in the room R and the setting positions of the projectors. For example, when 1 is designated as the number of projectors to be set in the room R, the processing device 240 reads out the identification information and the setting position information stored in the setting support database DB in association with the projection range information indicating the same shape as the shape indicated by the designated range information and indicating the same position as the position indicated by the designated range information to thereby specify the model and the setting positions of the projectors to be set in the room R. The processing device 240 causes the display device to display the icon G7 based on the specified setting positions and causes the display device to display information indicating the specified model in association with the icon G7. For example, the processing device 240 may display a balloon on the icon G7 and display a character string indicating the model in the balloon. The icon G7 and the character string indicating the model are examples of the third information indicating the model and the setting positions of the projectors.

Figure 11:
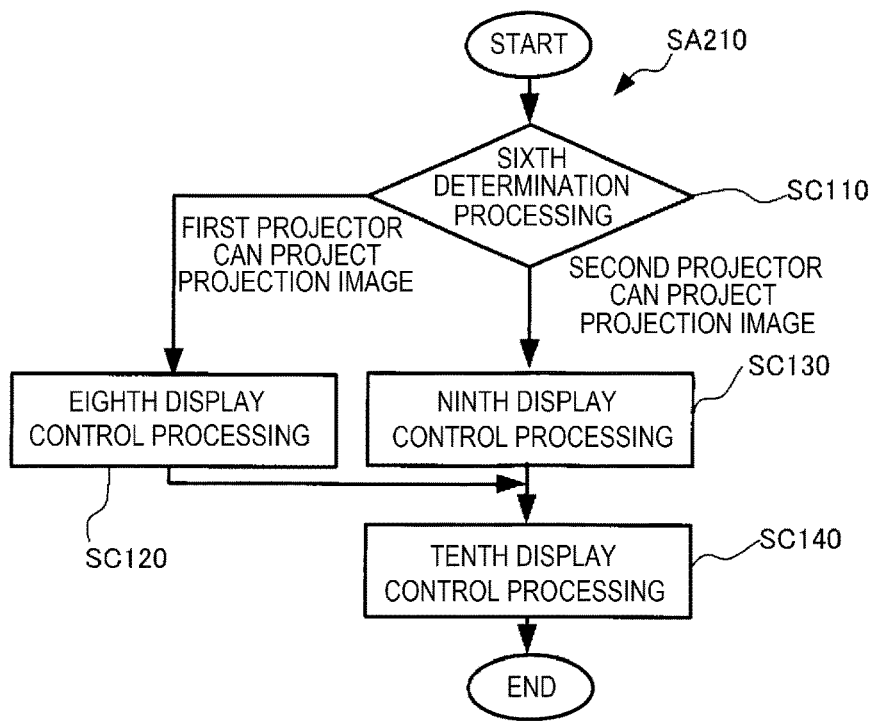
FIG. 11 is a flowchart showing a flow of the fourth display control processing in a modification.

In the case of an aspect in which the number of projectors to be set in the room R is not designated and a model of the projectors to be set in the room R is not designated either, the processing device 240 executes the fourth display control processing SA210 shown in FIG. 11 to thereby realize an output of a pattern 5 in FIG. 8. As shown in FIG. 11, the fourth display control processing SA210 in this aspect includes sixth determination processing SC110, eighth display control processing SC120, ninth display control processing SC130, and tenth display control processing SC140. In the sixth determination processing SC110, the processing device 240 determines whether the projection image G1 can be projected by one projector in the projection range indicated by the designated range information. More specifically, the processing device 240 determines whether the identification information and the setting position information stored in the setting support database DB in association with the projection range information indicating the same shape as the shape indicated by the designated range information and indicating the same position as the position indicated by the designated range information are present to thereby determine whether the projection image G1 can be projected by one projector.

When it is determined in the sixth determination processing SC110 that the projection image G1 can be projected by one projector, the processing device 240 executes the eighth display control processing SC120 and the tenth display control processing SC140. In the eighth display control processing SC120, the processing device 240 causes the display device to display the image G8 obtained by superimposing the fifth image showing the first projector on the image G6. In the tenth display control processing SC140 executed following the eighth display control processing SC120, the processing device 240 causes the display device to display an image obtained by superimposing the seventh image on the image G8. When it is determined in the sixth determination processing SC110 that the projection image G1 can be projected by the second projector of a model different from the first projector, the processing device 240 executes the ninth display control processing SC130 and the tenth display control processing SC140. In the ninth display control processing SC130, the processing device 240 causes the display device to display the image G8 obtained by superimposing the sixth image showing the second projector on the image G6. In the tenth display control processing SC140 executed following the ninth display control processing SC130, the processing device 240 causes the display device to display an image obtained by superimposing the eighth image on the image G8. When it is determined that the projection image G1 cannot be projected by one projector, the processing device 240 may divide the projection range into a plurality of sub-projection ranges and determine whether the identification information and the setting position information corresponding to each of the sub-projection ranges are present. The tenth display control processing SC140 in FIG. 10 may be omitted.

As in a pattern 2 in FIG. 8, the processing device 240 may cause the user to designate one or a plurality of setting positions of projectors in the room R in addition to the shape and the position of the projection range and cause, based on the setting position and the designated range information, the display device to display the third information indicating a model and the number of projectors to be set in the room R. Examples of a specific method of causing the user to designate setting positions of projectors in the room R include an aspect in which the setting positions are designated by a tap or the like on the room image G2. The user holding the information processing device 20 in a hand may move from a reference position in acquiring the room information to a setting position and perform predetermined operation such as a tap. The processing device 240 may calculate, from an output of an inertial sensor, a change in the position of the information processing device 20 from the reference position to a point in time when the predetermined operation is performed to thereby calculate the setting position. In this case, the processing device 240 may cause the display device to display a message such as "Please hold the information processing device 20 at height where the projector is set" to thereby urge the user to designate the height where the projector is set. If the processing device 240 executes the processing explained above with a setting position designated most recently set as a new reference position, it is possible to designate a plurality of setting positions. When the number of setting positions designated by the user and a calculated number of projectors are different, the processing device 240 may cause the display device to display an error message. When the number and setting positions of projectors to be set in the room R are designated by the user in addition to the shape and the position of the projection range, inputs and outputs of a pattern 3 shown in FIG. 8 are realized. When a model and setting positions of projectors to be set in the room R are designated by the user in addition to the shape and the position of the projection range, inputs and outputs of a pattern 4 shown in FIG. 8 are realized.

(5) The first acquirer 241, the display controller 242, the second acquirer 243, and the third acquirer 244 in the embodiment are the software modules but may be hardware modules such as an ASIC (Application Specific Integrated Circuit). In the embodiment, the setting support database DB is stored in the storage device 230 of the information processing device 20. However, a communication device that executes wired communication or wireless communication under control by the processing device 240 may be provided in the information processing device 20. The setting support database DB may be stored in a storage device accessible to the communication device. The information processing device 20 in the embodiment is the smartphone but may be a tablet terminal or a personal computer. The information processing device 20 in the embodiment includes one processing device 240 but may include a plurality of processing devices 240. The information processing device 20 only has to include the display device and at least one processing device 240.

(6) In the embodiment, the program P1 is stored in advance in the storage device 230 of the information processing device 20. However, the program P1 may be manufactured or distributed alone. Examples of a specific distribution form of the program P1 include a form of writing the program P1 in a computer-readable recording medium such as a flash ROM (Read Only Memory) and distributing the program P1 and a form of distributing the program P1 by downloading the program P1 through an electric communication line such as the Internet. By causing a computer of a general smartphone to operate according to the program P1 distributed by these forms, it is possible to cause the computer to execute the display method according to the present disclosure.

3. Aspects Grasped from at Least One of the Embodiment and the Modifications The present disclosure is not limited to the embodiment and the modifications explained above and can be realized in various aspects without departing from the gist of the present disclosure. For example, the present disclosure can be realized by aspects explained below. Technical features in the embodiment corresponding to technical features in the aspects explained below can be substituted or combined as appropriate in order to solve apart or all of the problems of the present disclosure or in order to achieve apart or all of the effects of the present disclosure. Unless the technical features are explained as essential technical features in this specification, the technical features can be deleted as appropriate.

A display method according to an aspect of the present disclosure includes first acquisition processing SA110, first display control processing SA120, second acquisition processing SA190, and fourth display control processing SA210 explained below. In the first acquisition processing SA110, room information representing a three-dimensional shape of a room R including a projection surface SC onto which a projection image G1 is projected is acquired. The projection image G1 is an example of the first image in the present disclosure. The room information is an example of the first information in the present disclosure. In the first display control processing SA120, a room image G2 showing a three-dimensional shape of the room R is displayed on a display device based on the room information. The room image G2 is an example of the second image in the present disclosure. In the second acquisition processing SA190, operation for designating a projection range of the projection image G1 in the projection surface SC is received, whereby designated range information for defining the projection range is acquired. The designated range information is an example of the second information in the present disclosure. In the fourth display control processing SA210, third information indicating at least one of the number of one or a plurality of projectors to be set in the room R in order to project the projection image G1 in the projection range, a model of the one or the plurality of projectors, and a setting position in the room R of the one or the plurality of projectors is displayed on the display device to be superimposed on the room image G2 based on the room information and the designated range information. By setting the one or the plurality of projectors in the room R according to the third information displayed by the display method of this aspect, even a user not having expert knowledge concerning a projector is capable of appropriately setting the projector in the room R.

In a display method according to a more preferred aspect, the first acquisition processing SA110 may include acquiring the room information based on a captured image of the room R captured by an imaging device 210 located in the room R. According to this aspect, it is possible to more easily appropriately set the projector in the room R compared with an aspect in which the width of the room R, the depth of the room R, and the height of the room R are input as numerical values.

A display method according to a more preferred aspect may further include causing the display device to display an image G6 obtained by superimposing a projection range image G5 indicating the projection range on the room image G2. According to this aspect, it is possible to grasp the projection range in the room R through a visual sense. The projection range image G5 is an example of the third image in the present disclosure. In a display method according to a still more preferred aspect, the room R may include a plurality of walls and the room image G2 may show the plurality of walls of the room R. The causing the display device to display the image G6 obtained by superimposing the projection range image G5 on the room image G2 may include specifying the projection surface SC by receiving operation for designating a wall onto which the projection image G1 is projected among the plurality of walls shown by the room image G2. According to this aspect, it is possible to specify the projection surface SC with operation for designating the wall onto which the projection image G1 is projected among the plurality of walls shown by the room image G2.

A display method according to a more preferred aspect may further include second display control processing SA150 for causing the display device to display an image G4 obtained by superimposing a provisional image G3 showing a provisional projection range on the room image G2. The operation for designating the projection range may include operation for changing a shape and a position of the provisional image G3. In this aspect, the projection range image G5 shows a projection range, which is a result of the provisional projection range being changed by receiving the operation for changing the shape and the position of the provisional image G3. According to this aspect, it is possible to designate a shape and a position of the projection range by the operation for changing the shape and the position of the provisional image G3. The second display control processing SA150 in a display method according to a still more preferred aspect may further include causing the display device to display a notification for urging the operation for changing the shape and the position of the provisional image G3.

A display method according to a more preferred aspect may further include receiving an input of fourth information indicating a range in which the projector 10 is set in the room R, the third information may include a setting position, and the setting position may be a position within the range indicated by the fourth information. According to this aspect, it is possible to cause a user to input a range in which the projector 10 is set in the room R. In a display method according to a still more preferred aspect, the receiving the input of the fourth information may further include urging the input of the fourth information by causing the display device to display, to be superimposed on the room image, a fourth image showing a candidate of a range in which the projector 10 is set in the room R.

A display method according to a more preferred aspect may further include causing the display device to display a notification for urging movement to the setting position indicated by the third information.

In a display method according to a more preferred aspect, a first projector and a second projector may be included in the one or the plurality of projectors. The fourth display control processing SA210 in the display method according to this aspect may include eighth display control processing SC120 and ninth display control processing SC130. The eighth display control processing SC120 is processing for causing the display device to display an image G8 obtained by superimposing a fifth image showing the first projector on the image G6. The ninth display control processing SC130 is processing for causing the display device to display the image G8 obtained by superimposing a sixth image corresponding to the second projector on the image G6. A display method according to a still more preferred aspect may further include tenth display control processing SC140 for causing the display device to display, to be superimposed on the image G8, a seventh image showing a projection range by the first projector and an eighth image showing a projection range by the second projector. According to this aspect, the user can grasp the projection range by the first projector and the projection range by the second projector through a visual sense.

The fourth display control processing SA210 in the aspect in which the first projector and the second projector are included in the one or the plurality of projectors may include fourth determination processing SB110, fifth display control processing SB120, fifth determination processing SB130, and sixth display control processing SB140. The fourth determination processing SB110 is processing for determining whether the projection image G1 can be projected in the projection range indicated by the designated range information using the first projector. The fifth display control processing SB120 is executed when it is determined in the fourth determination processing SB110 that the projection image G1 can be projected using the first projector. In the fifth display control processing SB120, the image G8 obtained by superimposing the fifth image on the image G6 is displayed on the display device. The fifth determination processing SB130 is executed when it is determined in the fourth determination processing SB110 that the projection image G1 cannot be projected using the first projector. The fifth determination processing SB130 is processing for determining whether the projection image G1 can be projected in the projection range indicated by the designated range information using the first projector and the second projector. The sixth display control processing SB140 is executed when it is determined in the fifth determination processing SB130 that the projection image G1 can be projected using the first projector and the second projector. In the sixth display control processing SB140, the image G8 obtained by superimposing the fifth image and the sixth image on the image G6 is displayed on the display device.

An information processing device according to an aspect of the present disclosure includes a display device and at least one processing device. The at least one processing device executes the first acquisition processing SA110, the first display control processing SA120, the second acquisition processing SA190, and the fourth display control processing SA210 explained above. With the information processing device according to this aspect as well, even a user not having expert knowledge concerning a projector is capable of appropriately setting the projector in the room R.

A non-transitory computer-readable storage medium according to an aspect of the present disclosure stores a program for causing a computer to execute the first acquisition processing SA110, the first display control processing SA120, the second acquisition processing SA190, and the fourth display control processing SA210 explained above. With the program according to this aspect as well, even a user not having expert knowledge concerning a projector is capable of appropriately setting the projector in the room R.

What is claimed is:

1. A display method comprising:
   acquiring first information representing a three-dimensional shape of a room including a projection surface onto which a first image is projected;
   displaying, based on the first information, a second image showing the three-dimensional shape of the room by a display device held by a user;
   acquiring second information which defines a projection range of the first image in the projection surface by receiving operation for designating the projection range;
   displaying, by the display device, and based on the first information and the second information, third information superimposed on the second image, the third information indicating a setting position in the room of one or a plurality of projectors in the room in order to project the first image in the projection range and at least one of a number of the one or the plurality of projectors or a model of the one or the plurality of projectors; and
   displaying, by the display device, a notification for urging and directing the user holding the display device to move to the setting position of the one or the plurality of projectors.

2. The display method according to claim 1, wherein the acquiring the first information includes acquiring the first information based on a captured image captured by an imaging device located in the room.

3. The display method according to claim 1, further comprising displaying, by the display device, a third image showing the projection range superimposed on the second image.

4. The display method according to claim 3, wherein
   the second image shows the plurality of walls that the room includes, and
   the displaying the third image includes detecting the projection surface by receiving operation for designating a wall onto which the first image is projected among the plurality of walls.

5. The display method according to claim 3, further comprising displaying, by the display device, a provisional image showing a provisional projection range by superimposing the provisional image on the second image, wherein
   the operation for designating the projection range includes operation for changing a shape and a position of the provisional image.

6. The display method according to claim 5, further comprising displaying, by the display device, a notification for prompting operation for changing the shape and the position of the provisional image.

7. The display method according to claim 1, further comprising receiving an input of fourth information indicating a range in which the one or the plurality of projectors are disposed in the room, wherein
   the third information includes the setting position, and
      the setting position is a position within the range indicated by the fourth information.

8. The display method according to claim 7, further comprising prompting the input of the fourth information by superimposing a fourth image showing a candidate of the range in which the one or the plurality of projectors are disposed.

9. The display method according to claim 1, wherein
   the one or the plurality of projectors include a first projector and a second projector, and
   the displaying the third information includes
      displaying a fifth image showing the first projector superimposed on the second image in a position corresponding to a setting position of the first projector in the room, and
      displaying a sixth image showing the second projector superimposed on the second image in a position corresponding to a setting position of the second projector in the room.

10. The display method according to claim 9, further comprising displaying, a seventh image showing a projection range by the first projector superimposed on the second image, and an eighth image showing a projection range by the second projector superimposed on the second image.

11. The display method according to claim 9, further comprising:
   determining whether it is possible to project the first image in the projection range indicated by the second information using the first projector;
   when it is determined that it is possible to project the first image using the first projector, displaying the fifth image by the display device;
   when it is determined that it is not possible to project the first image using the first projector, determining whether the first image can be projected in the projection range indicated by the second information using the first projector and the second projector; and
   when it is determined that it is possible to project the first image using the first projector and the second projector, displaying the fifth image and the sixth image to be superimposed on the second image by the display device.

12. An information processing device comprising:
   a display device; and
   at least one processing device programmed to
      acquire first information representing a three-dimensional shape of a room including a projection surface onto which a first image is projected;
      display, based on the first information, a second image showing the three-dimensional shape of the room by a display device held by a user;
      acquire second information which defines a projection range of the first image in the projection surface by receiving operation for determining the projection range;
      display, by the display device, and based on the first information and the second information, third information superimposed on the second image, the third information indicating a setting position in the room of one or a plurality of projectors in the room in order to project the first image in the projection range and at least one of a number of the one or the plurality of projectors or a model of the one or the plurality of projectors; and
      display, by the display device, a notification for urging and directing the user holding the display device to move to the setting position of the one or the plurality of projectors.

13. A non-transitory computer-readable storage medium storing a program for causing a computer to execute:
   acquiring first information representing a three-dimensional shape of a room including a projection surface onto which a first image is projected;
   displaying, based on the first information, a second image showing the three-dimensional shape of the room by a display device held by a user;

acquiring second information which defines a projection range of the first image in the projection surface by receiving operation for determining the projection range;

displaying, by the display device, and based on the first information and the second information, third information superimposed on the second image, the third information indicating a setting position in the room of one or a plurality of projectors in the room in order to project the first image in the projection range and at least one of a number of the one or the plurality of projectors or a model of the one or the plurality of projectors;

displaying, by the display device, a notification for urging and directing the user holding the display device to move to the setting position of the one or the plurality of projectors.

* * * * *